No. 880,233.  PATENTED FEB. 25, 1908.
J. A. McQUADE.
STREET CAR FENDER.
APPLICATION FILED DEC. 9, 1907.
3 SHEETS—SHEET 1.
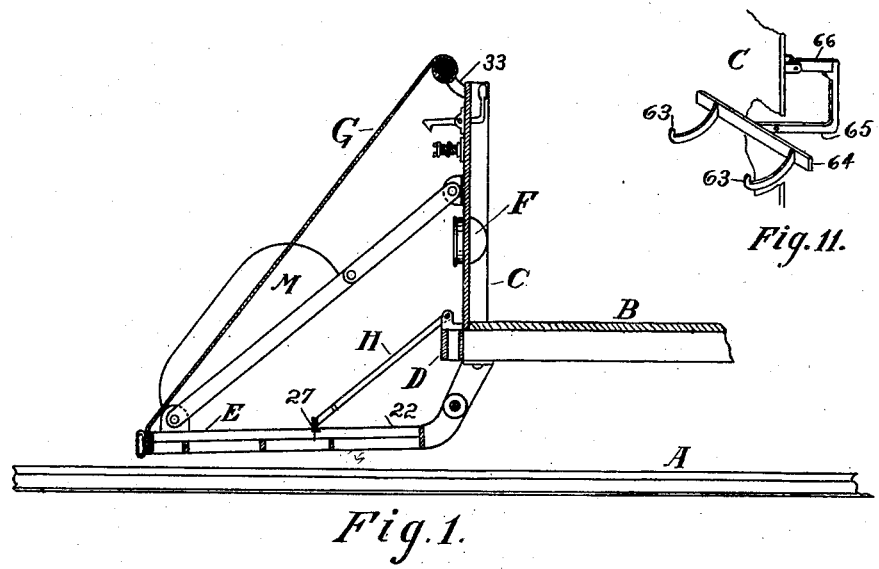
Fig. 1.
Fig. 11.
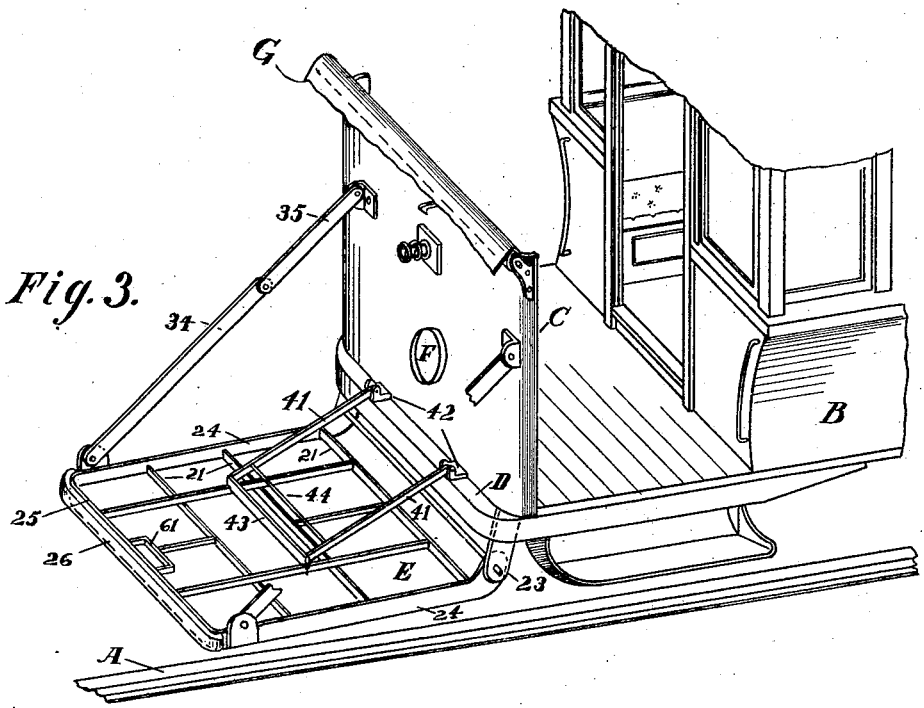
Fig. 3.
WITNESSES:
Mary D. Doyle
Mary V. Allen
INVENTOR.
James A. McQuade
BY
Gardner W. Pearson
ATTORNEY.

No. 880,233.

J. A. McQUADE.
STREET CAR FENDER.
APPLICATION FILED DEC. 9, 1907.

PATENTED FEB. 25, 1908.

3 SHEETS—SHEET 2.

WITNESSES:
Mary D. Doyle
Mary V. Allen

INVENTOR.
James A. McQuade
BY
Gardner W. Eason
ATTORNEY.

No. 880,233.  
J. A. McQUADE.  
STREET CAR FENDER.  
APPLICATION FILED DEC. 9, 1907.  
PATENTED FEB. 25, 1908.  
3 SHEETS—SHEET 3.

WITNESSES:  
Mary D. Doyle  
Mary V. Allen

INVENTOR.  
James A. McQuade  
BY  
Gardner W. Pierson  
ATTORNEY.

UNITED STATES PATENT OFFICE.

JAMES A. McQUADE, OF LOWELL, MASSACHUSETTS.

STREET-CAR FENDER.

No. 880,233.  Specification of Letters Patent.  Patented Feb. 25, 1908.

Application filed December 9, 1907. Serial No. 405,717.

*To all whom it may concern:*

Be it known that I, JAMES A. McQUADE, a citizen of the United States, residing at Lowell, in the county of Middlesex and State of Massachusetts, have invented certain new and useful Improvements in Street-Car Fenders, of which the following is a specification.

This invention relates to fenders for street cars. Its purpose is to provide a fender which is ordinarily folded against the dash board of the car but can be thrown into place with great rapidity whenever an accident is imminent. If preferred, it can be left down upon the forward end of the car and a similar fender can be kept folded on the rear end. If the direction of the car is reversed, the fenders can be changed accordingly. This fender is so arranged that, when down, the forward end will be close to the tracks and road bed and will be held rigidly in that position, so that any person or object cannot get underneath the fender. The front of the fender is suitably padded or provided with a pneumatic cushion and a sheet of canvas running therefrom to the top of the dash board provides a soft and yielding resting place for any object struck. It does not interfere with any of the mechanism for operating the car nor with the head light.

Figure 2:
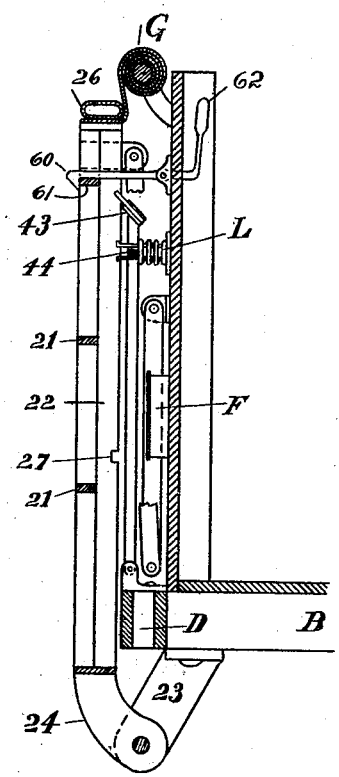
Figure 8:
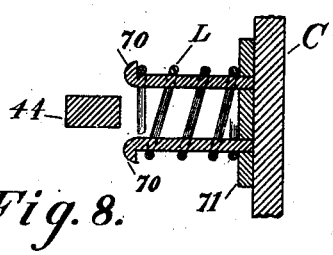
Figure 7:
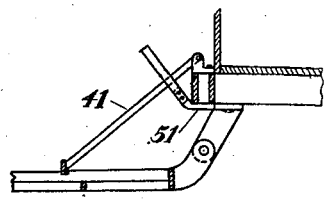
Figure 6:
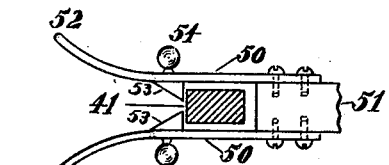
Figure 4:
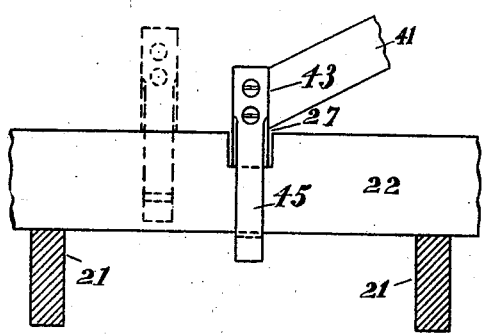
Figure 5:
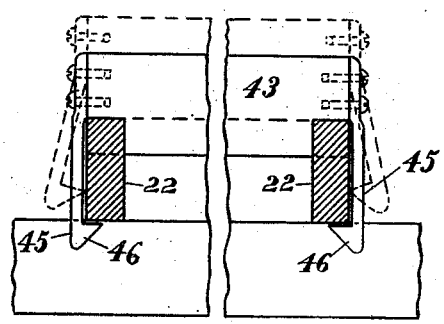
Figure 9:
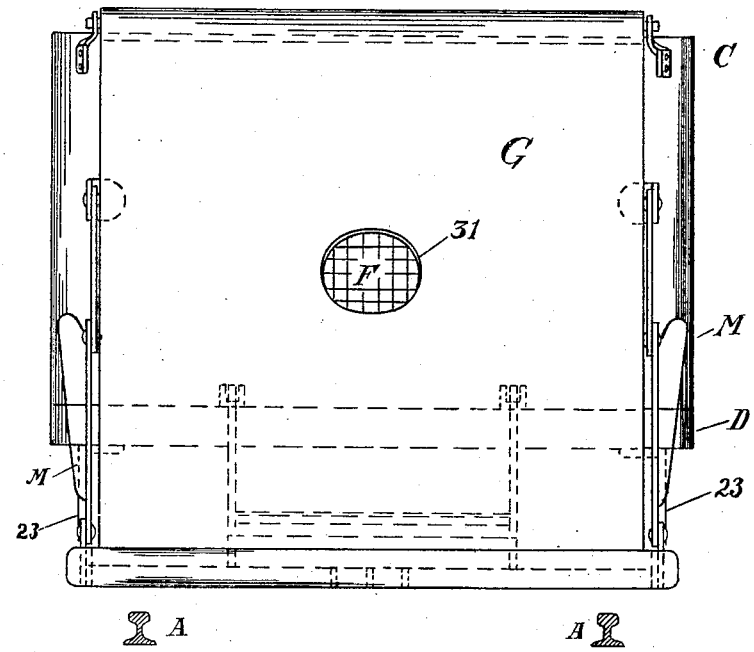
Figure 10:
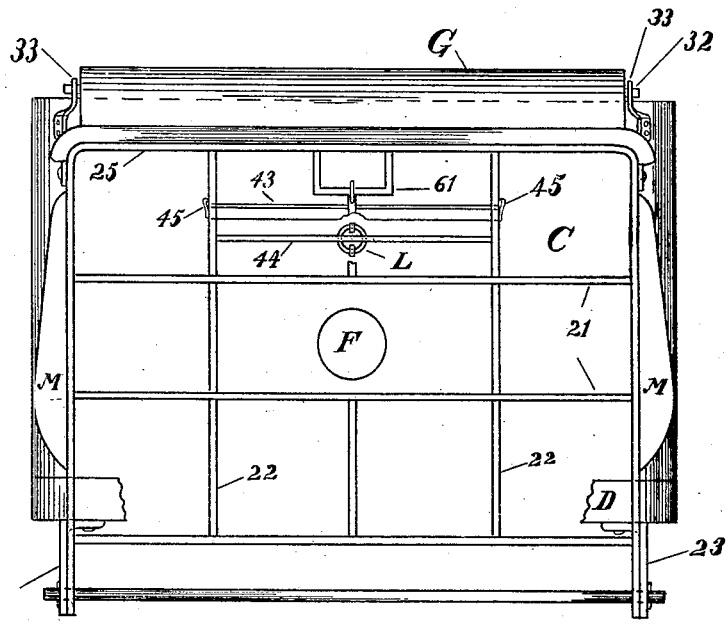

My invention is shown in the accompanying drawings in which,

Figure 1 is a sectional side view of the device when down and ready for action. Fig. 2 is a sectional side view of the device folded up against the dash board. Fig. 3 is a perspective of the device when down with the curtain and one hanger arm partly broken away. Fig. 4 is a detail side view and Fig. 5 is a detail front view of the locking device. Figs. 6 and 7 are details of an alternative form of locking device. Fig. 8 is a detail of the main spring. Fig. 9 is a view from the front when the device is down and Fig. 10 is a view from the front with the device raised. Fig. 11 is an alternative form of trigger or release mechanism.

A represents the rails, B represents the body of the car, C represents the dash board, and D represents the bumper at the bottom of the dash board, such as is used on many cars.

The bottom frame or gridiron E of the fender is rectangular in shape comprises side bars 24, a front bar 25, and is stiffened by transverse braces 21 and by longitudinal tracks 22 which rest upon said braces. The bottom frame E is pivoted to brackets 23 which extend downward from the front of the car and its side bars 24 are preferably curved, so that when the fender is up, as shown in Fig. 2, it will clear the bumper D, head light F and other attachments.

The front bar 25 is preferably protected by a pneumatic or other suitable cushion 26 and to it is also attached one end of the curtain G which is provided with an opening 31 through which the head light can shine when the fender is down. The other end of curtain G is attached to a spring roller 32 carried by brackets 33 attached near the top of dash board C. This roller is so arranged that it will roll up curtain G when gridiron E is raised and will let it out as frame E is lowered. Curtain G should be firmly fastened to roller 32 and should be of such length that when the fender is down, if a person or object falls upon it, the curtain will yield but not sufficiently to strike the gridiron E.

To prevent the gridiron E or any part thereof from striking the ground or tracks, I support it from dash board C by means of the hanger arms 34 and 35 pivoted respectively to each other to the side bars 24 of gridiron E and to the dash board C. Thereby the drop of gridiron E is limited and it cannot strike the rails or road bed.

To prevent the fender, after it is down, from rising on account of the motion or shaking of the car or otherwise, I provide the locking device H. This locking device is formed of side bars 41, 41 which are pivoted at any convenient point in front of the dash board and above the pivotal point of gridiron E on brackets 23, as for instance, to brackets 42 on bumper D. The other end of the locking device H comprises locking bar 43 which connects side bars 41 and preferably also a brace 44 to be described. Tracks 22 are provided at a suitable point with notches 27 of such size that locking bar 43 will just drop thereinto when the fender is down as far as it is permitted by the hanger arms 34, 35. It will be readily seen that when the fender is dropped, bar 43 will slide along tracks 22 from the position shown in Fig. 2 to that shown in Fig. 1. When it enters notch 27 it will hold gridiron E firmly down and as hanger arms 34 and 35 prevent it from rising, the fender is firmly locked in place.

As locking bar 43 might be shaken out of notches 27, I provide latches 45 which are made of spring metal and are attached one at each end of bar 45. Each is hooked at its end 46 with a nose square at the top and slanting at the bottom, said hook being at such distance from the bottom of bar 43 that it will press against the side of rail 22, as shown by the dotted lines in Figs. 4 and 5 until locking bar 43 drops into notches 27, when hook 46 will drop below and spring under rail 22, thus holding locking bar 43 in place until the latches are released by hand.

Instead of the form of latches described above, I may use a double spring bracket, see Figs. 6 and 7, attached at a suitable point on the front of the car and comprising the following features. The spring side arms 50, 50 are attached one on each side of the points where side bars 41 of the locking device will rest when the device is down. Preferably they are attached on each side of a suitable bracket 51. Preferably each spring arm 50 curves outward, as at 52, to guide a side bar 41 as it drops, and each is provided on its inside at opposite points with a nose 53 of triangular shape which, by reason of the elasticity of arms 50, will allow side bar 41 to pass inside but will prevent it from passing out until released by hand. Preferably knobs 54 are provided to serve as handles for releasing arms 50.

To retain the fender in an upright position against the front of the dash board, I pivot a hook 60 to the dash board near the top in a position to engage any suitable cross bar of the fender or preferably the special trigger cross bar 61. This hook 60 is extended through the dash board and is bent upward to form a handle 62 within easy reach of the motorman or driver of the car. It is apparent that by pulling backward this handle or trigger 62, the fender will be released from hook 60 and will drop of its own weight.

Another form of trigger or release mechanism is shown in Fig. 11, in which 63, 63, are curved arms provided with hooks which engage trigger bar 61 when the fender is raised. These arms are connected by a bar 64 and all are carried by bent arm 65 pivoted to and passed through the dash board C. By pushing forward trigger arm 65, hooks 63, 63 are depressed and the fender released. To prevent accidental displacement however, I use a safety lock 66 which is pivoted to the dash board at one end and at its other end rests against a notch on the inside of the trigger arm 65. This locks the trigger until it is raised by the finger of the motorman which can be done instantly and the trigger operated by substantially the same motion. In this case the trigger is pushed instead of pulled.

While the force of gravity and the momentum of the car would be sufficient to drop the fender when the trigger was pulled, I find that it is better and surer to attach to the front of the dash board a main spring L so placed that brace 44 of the locking device will strike it and compress it when the fender is raised, as shown in Fig. 2. This spring L is coiled about spring guides 70, 70 suitably headed to prevent spring L from escaping. These spring guides 70, 70 project from the top and bottom of a spring plate 71 attached to dash board C.

Starting with the fender raised, as shown in Figs. 2 and 10, when the motorman sees any object on the track, he operates the trigger by hand, thereby releasing the fender. Spring L at once expands with such force as to throw the locking device H and thus also the fender out and down. Curtain G is unwound and carried with it. When bottom frame E reaches the limit of hanger arms 34 and 35, locking device H, which has forced it and followed it down, drops into notches 27 and holds it in place. The action is substantially instantaneous and positive.

To prevent any person from falling off the sides and perhaps being thrown under the car, I prefer to provide wings M attached to hanger arms 34 in a diagonal position. As these wings are canvas on a metal frame or of wood and project outside curtain G, and as curtain G gives when an object is struck, they keep the object in place on the fender and thus avoid any chance of rolling off.

Preferably the opening 31 in curtain G should be covered with a netting so that a child or small animal or its limbs cannot get through. I prefer to have main spring L act upon the locking device rather than directly upon the gridiron for the reason that it thereby keeps the locking bar 43 more positively in contact with the tracks 22, and thus makes the locking more positive.

What I claim as my invention and desire to cover by Letters Patent, is:

1. In a street car fender, downwardly projecting brackets, a bottom frame or gridiron pivoted thereto and comprising at its top longitudinal tracks, a dash board, a spring roller carried at the top thereof, a curtain attached to the roller and to the forward end of the gridiron, pivoted hanger arms between the dash board and gridiron whereby its drop is limited, means for holding and releasing the gridiron when folded against the dash board, and a locking device adapted to automatically lock the gridiron in position when down to prevent it from rising.

2. In a street car fender, downwardly projecting brackets, a bottom frame or gridiron pivoted thereto and comprising at its top longitudinal tracks, a dash bgard, a spring roller carried at the top thereof, a curtain attached to the roller and to the forward end of the gridiron, pivoted hanger arms between the dash board and gridiron whereby its drop is limited, a trigger adapted to hold and to release the gridiron when folded against the dash board, a main spring attached to the dash board and so placed as to be compressed when the gridiron is held upright by the trigger, and a locking device adapted to automatically lock the gridiron in position when down and to prevent it from rising.

3. In a street car fender, a pivoted gridiron comprising parallel longitudinal tracks provided with notches, pivoted hanger arms therefor, and a lock comprising side arms pivoted to the dash board and connected by a locking bar adapted to enter said notches when the fender is dropped.

4. In a street car fender, a pivoted gridiron comprising parallel longitudinal tracks provided with notches, pivoted hanger arms therefor, and a lock comprising side arms pivoted to the dash board and connected by a locking bar adapted to enter said notches when the fender is dropped, and latches adapted to hold said locking bar in the notches.

5. In a locking device for street car fenders, a pivoted bottom frame comprising parallel longitudinal tracks with notches therein, side bars pivoted to the dash board, a locking bar which connects said side bars and is adapted to drop into said notches, and latches at each end of said locking bar adapted to pass under said tracks when the locking bar is in said notches.

6. In a car fender lock, a pivoted bottom frame comprising longitudinal tracks in which are notches, combined with side bars pivoted to the dash board, a locking bar which connects said side bars and is adapted to enter said notches, and latches so attached at each end of the locking bar as to rest against the sides of the tracks when the locking bar rests thereon, and under the tracks when the locking bar rests in the notches.

7. In a street car fender, downwardly projecting brackets, a bottom frame or gridiron pivoted thereto and comprising at its top longitudinal tracks, a dash board, a spring roller carried at the top thereof, a curtain attached to the roller and to the forward end of the gridiron, pivoted hanger arms between the dash board and gridiron whereby its drop is limited, diagonal wings attached to the hanger arms, means for holding and releasing the gridiron when folded against the dash board, and a locking device adapted to automatically lock the gridiron in position when down to prevent it from rising.

In testimony whereof I affix my signature in presence of two witnesses.

JAMES A. McQUADE.

Witnesses:
   FISHER H. PEARSON,
   FLORENCE A. PARR.